(No Model.) 2 Sheets—Sheet 1.

E. B. KILLEN.
SUSPENSION RIM FOR VEHICLE WHEELS.

No. 526,713. Patented Oct. 2, 1894.

Witnesses:
E. B. Bolton
H. Van Olvennel

Inventor:
Edward Brice Killen
By Richardson
his Attorneys.

(No Model.) 2 Sheets—Sheet 2.
E. B. KILLEN.
SUSPENSION RIM FOR VEHICLE WHEELS.
No. 526,713. Patented Oct. 2, 1894.
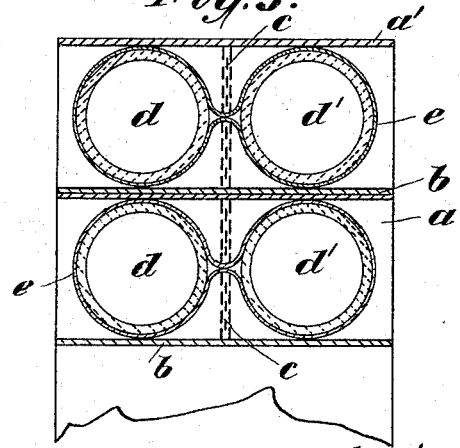
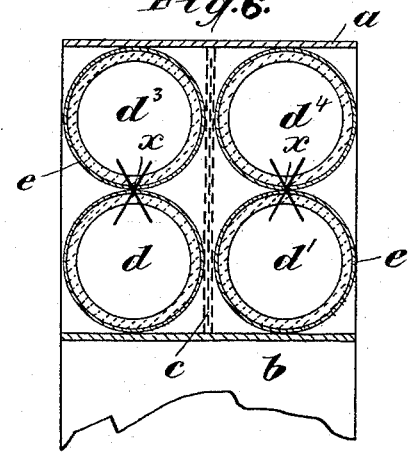
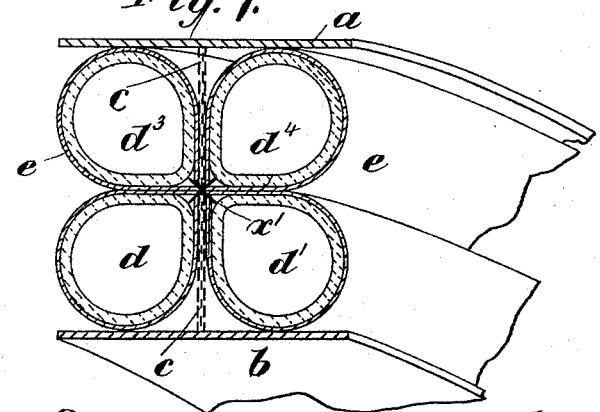
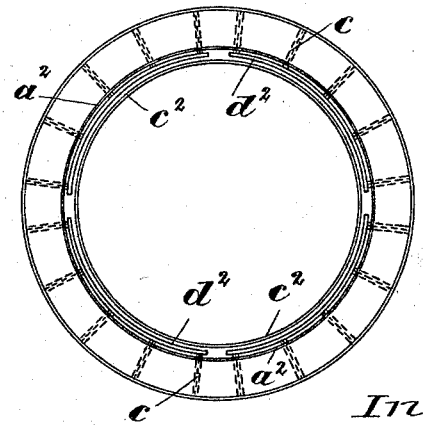
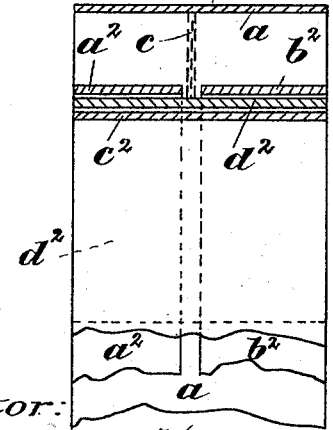
Witnesses:
E. B. Bolton
H. Van Oldenneel
Inventor:
Edward Brice Killen
By
his Attorneys

UNITED STATES PATENT OFFICE.

EDWARD B. KILLEN, OF BELFAST, IRELAND.

SUSPENSION-RIM FOR VEHICLE-WHEELS.

SPECIFICATION forming part of Letters Patent No. 526,713, dated October 2, 1894.

Application filed April 24, 1894. Serial No. 508,851. (No model.) Patented in England April 26, 1893, No. 8,390.

*To all whom it may concern:*

Be it known that I, EDWARD BRICE KILLEN, tea-dealer, a subject of the Queen of Great Britain and Ireland, and a resident of the city of Belfast, Ireland, have invented certain new and useful Improvements in Suspension-Rims for Cycles and other Vehicles, of which the following is a specification.

This invention mainly relates to a suspension rim for cycles and other vehicles and it has the advantage of being very resilient and at the same time puncture proof. Its construction is such that it can bear immense pressure and it can, therefore, as a consequence, be applied to the wheels of heavy vehicles as well as light ones. This suspension rim can be easily attached to and detached from a wheel. Cycles and other vehicles having the rim applied to them can be driven over rough ground without risk of injury to the rim.

In order that my said invention may be properly understood I have hereunto appended an explanatory sheet of drawings, whereon—

Figure 1:
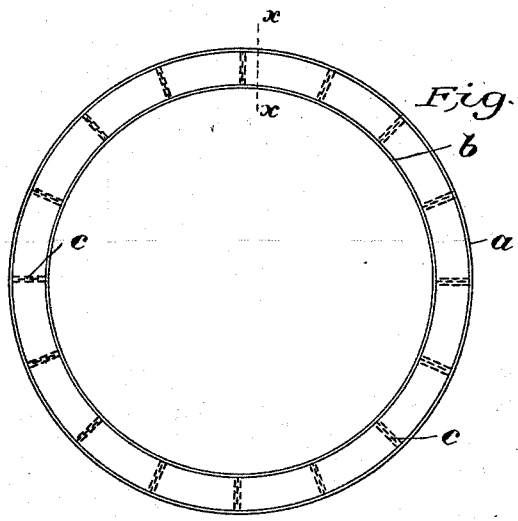
Figure 2:
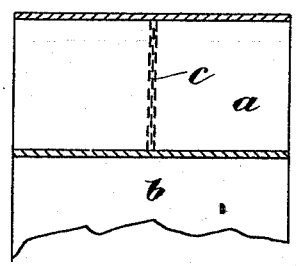
Figure 4:
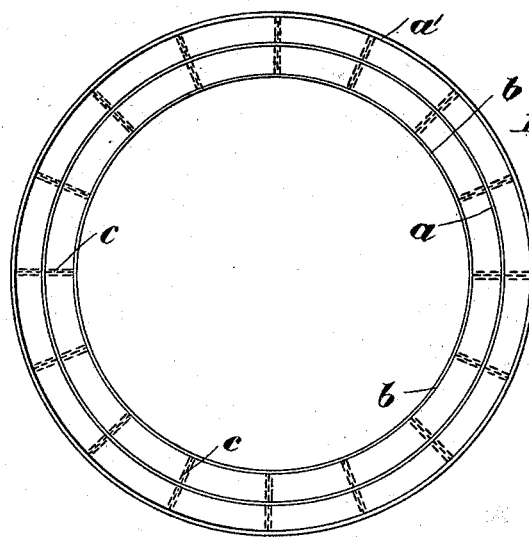
Figure 3:
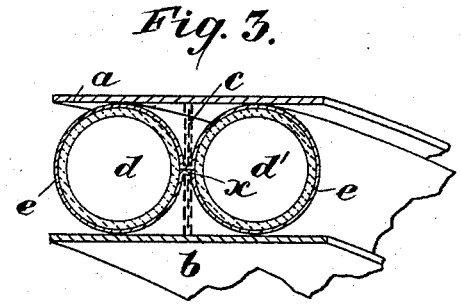

Figure 1 shows, in side elevation, two hoops suspended one inside the other by chains of equal length. Fig. 2 is a cross section of Fig. 1 on line $x$—$x$. Fig. 3 is a cross section showing a method of covering the tubes. Fig. 4 shows in elevation a modified construction of rim having two suspended rims fitted one inside the other. Fig. 5 is a cross section showing the pneumatic tubes as they appear when fitted in place in a rim of the construction shown at Fig. 4. Fig. 6 is a cross section showing four inflated tubes inserted between the inner and outer hoops and inclosed in one covering. Fig. 7 is a cross section showing a different method of covering the four inflated tubes. Figs. 8 and 9 show a modified form of the inner hoop.

As will be seen the sectional views are drawn to an enlarged scale.

On the drawings the same reference letters wherever repeated indicate the same or similar parts.

My suspension rim is constructed as follows:

The hoops $a$, $b$, with diameters differing, say, about two inches are placed concentrically one within the other, as shown at Fig. 1. These hoops are suspended, one within the other, by means of a number of chains $c$, or their equivalent which are each of equal length. These suspension chains extend from the middle of the rim of the inner hoop to the middle of the rim of the outer hoop. Two rubber tubes or their equivalent $d$, $d'$, which are inclosed in a suitable unshrinkable covering $e$ and inflated with air or gas, run, side by side, round the entire rim, as shown at Fig. 3, filling up the space between the two suspended hoops, which have flat surfaces for the covered tubes to rest on. When pressure is applied to the outer suspended hoop the covered inflated tubes are pressed on or bear against these flat surfaces.

The covering $e$ of the tubes is made to fit round each inflated tube separately (see Fig. 3) so as to retain them in their proper relative positions to each other and to protect the rubber from being cut or injured. The cover may be made into two inclosing tubes by sewing it down the middle, as at $x$ Fig. 3.

The suspension chains $c$ which extend between the two inflated covered tubes, pass through that part of the unshrinkable covering $e$ which holds the inflated tubes close together and thereby keep the tubes in their proper position between the hoops $a$, $b$. The outer suspended hoop $a$ protects the tubes $d$, $d'$ from injury or puncture. The chains if necessary can be made fixtures at both ends and if required can be made to tighten up. This combination of hoops, suspension chains, and inflated covered tubes when properly put together, makes a pneumatic suspension rim which has great resiliency and is puncture proof.

The outer resilient hoop used in the construction of this pneumatic rim can be made of metal or a combination of metal, rubber and cork, or the equivalents of these having the desired strength, resiliency, lightness and durability. The inner hoop, which may be a metal one, is, preferably, so constructed that when applied or fitted to a wheel it remains rigid. It is not necessary to make the inner hoop rigid of itself, if it is to be applied to a rigid wheel which will give it the required rigidity when it is fitted in position.

By making the inner rigid hoop in the manner shown at Figs. 8 and 9 the suspension chains $c$ although made fast at both ends can be tightened up. In this case the inner rigid hoop is in reality formed of three hoops $a^2$, $b^2$, $c^2$. The diameters of $a^2$ and $b^2$ are the same and are a little larger than the diameter of $c^2$. The width of the rim of hoops $a^2$ and $b^2$ is the same and is not quite half the width of the rim of hoop $c^2$. The two hoops $a^2$ and $b^2$ which lie side by side fit over the hoop $c^2$. Between the rims of these hoops $a^2$, $b^2$ and $c^2$ are placed, say, four pieces of metal $d^2$ each piece being of the same width as the rim of hoop $c^2$. These pieces would of themselves if connected together form a circle the diameter of which would be smaller than the diameters of any of the three hoops $a^2$, $b^2$ and $c^2$. It is to these four pieces of metal (which if necessary can be cut into eight pieces) that the ends of the suspension chains $c$ are, as shown, fastened to the chains passing between the rims of hoops $a^2$ and $b^2$. To tighten the suspension chains it is only necessary to decrease the diameters of the hoops $a^2$, $b^2$, and if necessary $c^2$.

The same screws or bolts which are used to fasten the pneumatic suspension rim on to a wheel can be made use of to keep the hoops $a^2$, $b^2$ and $c^2$ and the metal pieces $d^2$ with suspension chains $c$ attached in their proper positions. The suspension chains can also be tightened up by fastening these suspension chains to a metal rod, strap, or equivalent, instead of to the inner rigid hoop. This rod would run round the entire inner rigid hoop lying in the center of the rim of rigid hoop and forming a circle and by making said rod capable of being easily removed and replaced so that different links of the suspension chains can be passed or fastened on to it, it is easy to tighten up suspension chains.

The outer hoop although resilient in itself, receives its great resilient strength and power by being suspended as hereinbefore described, and from the inflated covered tubes which, as aforesaid, lie well protected between the inner rigid hoop and the outer resilient one. The pressure put on the outer suspended hoop when it is in contact with the ground, is distributed all over this pneumatic suspension rim and is not confined to that part of the rim which is in immediate contact with the ground.

Greater resiliency can be given to the pneumatic rim without altering its width, in the following manner:

First. By using, as shown at Figs. 4 and 5 two, or more, pneumatic rims instead of one. In this case the outer rim which is of larger diameter is, if there are but two rims, made to fit exactly on the inner rim, and the outer hoop $a$ of the inner rim is fastened to the inner hoop $b'$, (which in this case in not rigid) of the larger outer rim, so that the two rims virtually form one large rim having a greatly increased resiliency. If desired only three hoops $b$, $a$, $a'$ may be used to construct the rim, the intermediate and outer hoops $a$, $a'$ being resilient and connected to each other and to the inner hoop $b$ by the suspension chains which, in this case, may pass through the intermediate hoop $a$.

Second. By increasing the difference in the diameters of the two hoops $a$, $b$ of the pneumatic rim to about four inches, instead of two inches, and doubling the number of pneumatic tubes as shown at Figs. 6 and 7. The two additional tubes $d^3$, $d^4$ when inflated and inclosed in their unshrinkable covering $e$, rest exactly on top of the other two and fill up the increased space between the suspension hoops.

In Fig. 6 the unshrinkable covering $e$ is shown as inclosing each tube separately and retaining them in their proper relative positions. The unshrinkable covering is connected throughout its length at the parts marked $x$. In Fig. 7 the unshrinkable covering is shown as connected throughout its length at the part $x'$.

The suspension chains $c$, pass, as shown, between each pair of inflated tubes and through the covering.

The width of my pneumatic suspension rim can be varied so as to suit almost any wheel by simply changing the sizes of the covered inflated tubes and making the difference in the diameters of the suspension hoops to suit the tubes required.

If the noise of the rim when running on the ground is objectionable a covering of rubber or other suitable material can be fitted tightly over the entire rim, or a part of it. This covering, which serves as an additional protection to the rim, and also prevents mud collecting on it, can be easily replaced, at small expense, when worn out.

The suspension rim can be attached or fitted to a vehicle wheel in any suitable and well known manner.

Wires or strips of metal or equivalents may be used in lieu of the chains.

These rims can be fitted to all old cycles without changing the shape of the old metal rim, which held the pneumatic tire, by simply filling up the old rim with cork or other suitable substance until the outside surface is flat, then fitting on the new rim and fastening the inner rigid rim of it to the old rim of cycle, the bolts or screws passing through the added cork or other substance.

Having now fully described my invention, what I claim, and desire to secure by Letters Patent, is—

1. A rim for cycles and the like consisting of the two hoops, the pair of inflated tubes between the hoops and the connections from inner to the outer hoops passing between the pair of inflated tubes, substantially as described.

2. A rim for cycles and the like consisting of the two hoops, the pair of inflated tubes between the hoops and the covering $e$ for said tubes connected together, substantially as described.

3. A rim for cycles and the like consisting of the two hoops, the pair of inflated tubes between the hoops, the coverings for the tubes connected together and the chain passing between the tubes and through their connected coverings, substantially as described.

4. A rim for cycles and other vehicles consisting of two or more hoops between which two or more inflated tubes or their equivalents are secured, said hoops being connected to each other by means of chains or their equivalent, said chains serving to hold the inflated tubes in place substantially as hereinbefore set forth.

Signed at Belfast this 21st day of March, A. D. 1894.

E. B. KILLEN.

Witnesses:
   A. C. LEWIS,
      *Belfast, Solr.*
   HENRY H. BOTTOMLEY,
      *Notary Public, Belfast.*